(12) United States Patent
Ohno

(10) Patent No.: US 6,477,330 B2
(45) Date of Patent: Nov. 5, 2002

(54) DATA-IMPRINTING OPTICAL SYSTEM FOR CAMERA

(75) Inventor: Kazunori Ohno, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/816,114

(22) Filed: Mar. 26, 2001

(65) Prior Publication Data

US 2001/0038754 A1 Nov. 8, 2001

(30) Foreign Application Priority Data

Mar. 30, 2000 (JP) ........................................ 2000-093068

(51) Int. Cl.$^7$ .............................................. G03B 17/24
(52) U.S. Cl. ...................................................... 396/315
(58) Field of Search ................................ 396/310, 315, 396/316, 317, 318

(56) References Cited

U.S. PATENT DOCUMENTS

| | | | | |
|---|---|---|---|---|
| 5,678,084 A | * | 10/1997 | Hori | 396/317 |
| 5,721,993 A | * | 2/1998 | Ito et al. | 396/315 |
| 5,930,538 A | * | 7/1999 | Ozaki et al. | 396/310 |
| 6,038,407 A | * | 3/2000 | Ito et al. | 396/317 |

OTHER PUBLICATIONS

Japanese Patent Office, "Japanese Unexamined Patent Publication No. 9–304823," Date of Publication: Nov. 28, 1997, Application No.: 9–56993, Filing Date: Feb. 25, 1997, pp. 1–6 (English Language Abstract).

Japanese Patent Office, "Japanese Unexamined Patent Publication No. 10–073878," Date of Publication: Mar. 17, 1998, Application No.: 8–229725, Filing Date: Aug. 30, 1996, pp. 1–9 (English Language Abstract).

Japanese Patent Office, "Japanese Unexamined Patent Publication No. 10–254099," Date of Publication: Sep. 25, 1998, Application No.: 9–53415, Filing Date: Mar. 7, 1997, pp. 1–9 (English Language Abstract).

* cited by examiner

*Primary Examiner*—Alan A. Mathews
(74) *Attorney, Agent, or Firm*—Snider & Associates Ronald R. Snider

(57) ABSTRACT

There is described a data-imprinting optical system for use with a camera which is composed of a single meniscus lens having a positive refracting power and a brightness aperture, which can be applied to a low-cost unsophisticated camera of manual advance type by satisfying predetermined conditional equations, and which enables miniaturization of and space-saving in a camera. Specifically, the data-imprinting optical system includes a single positive meniscus lens and a brightness aperture disposed on the part of a data display member. The positive meniscus lens is a plastic lens having an aspherical concave surface on the part thereof facing the data display member. An image of display information appearing on the data display member is projected on a film surface.

9 Claims, 6 Drawing Sheets

EXAMPLE 1

EXAMPLE 1

EXAMPLE 1

EXAMPLE 1

EXAMPLE 2

EXAMPLE 2

EXAMPLE 2

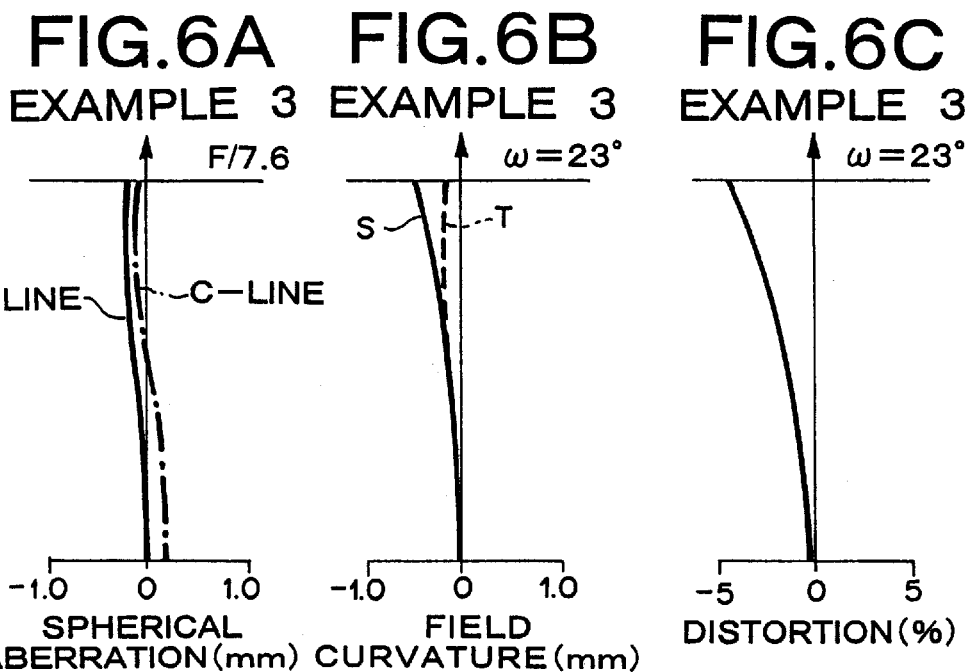
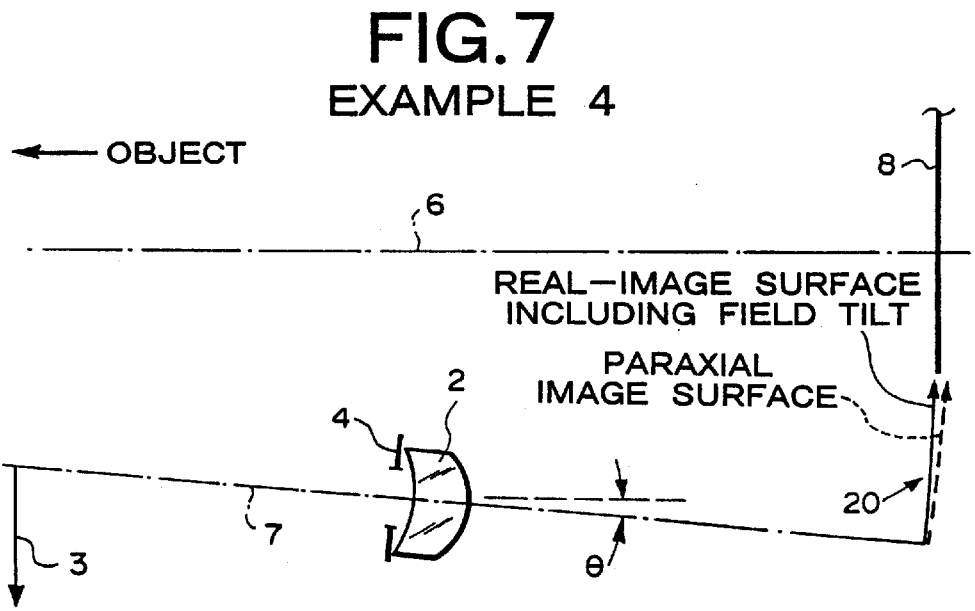

EXAMPLE 5

EXAMPLE 6

EXAMPLE 7

EXAMPLE 7

DATA-IMPRINTING OPTICAL SYSTEM FOR CAMERA

RELATED APPLICATIONS

This application claims the priority of Japanese Patent Application No. 2000-093068 filed on Mar. 30, 2000, which is incorporated herein by reference.

BACKGROUND OF THE INVENTION

1. Field of the Invention

The present invention relates to an unsophisticated data-imprinting optical system which can be applied to a camera capable of optically imprinting photographing data, such as a date, onto a film negative.

2. Description of the Prior Art

A system for a camera which enables imprinting of photographing data, such as a date, onto a film negative has hitherto been known, and imprinting of photographing data is one of the important functions of the camera.

Since long ago, such a system has been constructed such that a numerical string of a manually-set date is optically imprinted onto a film negative by means of a simple shutter which controls a projection lens and an exposure time. This system suffers a problem of a battery cell being depleted by an illumination lamp. Recent proliferation of a light source system which operates at an extremely-feeble electric current, such as an LED or liquid crystal, obviates the problem. Hence, the majority of cameras are equipped with this system. However, the system recently encounters a new problem, and another system capable of solving the new problem has recently been adopted.

In association with recent, rapid miniaturization of a camera, a limit is imposed on a space for positioning a data-imprinting optical system, and there arises a necessity for directly illuminating a numerical string or a string of characters by means of an LED or liquid crystal. The limit and the necessity account for the new problem. If a string of characters to be displayed is long, upsizing of a display element, such as an LED or liquid crystal, arises in addition to a problem of space. Accordingly, there arises a problem of inevitable use of a battery cell of large capacity, in addition to a cost problem. To solve the problems, there is employed a system which imprints data on a film negative, by means of illuminating a string of LEDs in a time sequence in the manner of a light sign board, and successively exposing the film in a time sequence through utilization of an automatic film take-up operation of the camera. This system involves use of only a single string of light sources. Traveling speed of a film negative rather than a shutter determines an exposure time, thereby imprinting data very efficiently. This is described in, for example, Japanese Unexamined Patent Publication No. 9(1997)-304823.

Such a data-imprinting optical system requires only an object size corresponding to the size of a single line of LEDs. The optical system has a narrow angle of view, and the only requirement is that image quality in the vicinity of center of the angle of view be compensated. Accordingly, sufficient performance of the optical system can be achieved by use of a single biconvex lens.

The foregoing system is predicated on an automatic film advancing operation of a camera. For this reason, the system cannot be applied to a low-cost, unsophisticated camera of manual-advance type which has recently become pervasive. The manual-advance camera involves indefinite film advance, which is very likely to result in unevenness in exposure of a character string.

An unsophisticated camera of manual advance type which has recently become pervasive requires a necessity of exposing data to be imprinted in the form of a regular character string by a single exposing operation. As a matter of course, strong demand has existed for miniaturizing such an unsophisticated camera. In contrast with the data-imprinting camera described previously, the unsophisticated camera encounters difficulties in reducing an imaging factor and the angle of view of a character string and constructing a projection lens from a single biconvex lens, which would otherwise increase an optical path length and hinder miniaturization of a camera.

Difficulties are encountered in direct application of the related-art technique to a data-imprinting optical system of an unsophisticated camera of manual advance type which has currently become pervasive. Therefore, development of a new data-imprinting optical system has been desired.

In connection with such a desire, there has been known a technique for exposing all display data within a single period of exposure time by a single operation, as described below.

Several methods for introducing extraneous light into the data-imprinting optical system are described in Japanese Unexamined Patent Publication No. 10(1998)-073878. Particularly, the publication includes a description about a lens-equipped camera of film type having a liquid-crystal display imprinting function. Back light is usually used for liquid crystal display. However, a camera is made inexpensive by use of the intensive extraneous light collected by a condenser lens. The technique has great value as a light-source system of a data impinging optical system. However, no contrivance has been made on the technique for realizing miniaturization of and space-saving in the camera.

Japanese Unexamined Patent Publication No. 10(1998)-254099 also describes a lens-equipped camera of film type having a liquid-crystal display imprinting function. More specifically, the publication describes a technique for collecting extraneous light on a liquid-crystal display surface more efficiently. However, this publication also fails to describe a contrivance to enable miniaturization of and space-saving in the camera.

The present invention has been conceived against the foregoing backdrop and is aimed at providing a data-imprinting optical system which can be applied to a low-cost, unsophisticated camera of manual film advance type and enables miniaturization of and space-saving in the camera.

SUMMARY OF THE INVENTION

Accordingly, the present invention provides a data-imprinting optical system which imprints, onto a film surface, data appearing on a photographing information/data display member located on the part of an object relative to the film surface and which is separate from a photographing lens, wherein the optical system comprises one meniscus lens having a positive refractive power and a brightness aperture and satisfies conditional expressions (1) through (3) provided below:

$$3.9 \leq L/F < 5.0 \qquad (1)$$

$$0.02 < D_1/F < 0.10 \qquad (2)$$

$$-0.5 < R_3/F < -0.2 \qquad (3)$$

where,

L: distance from the photographing data display member to the film surface along the optical axis of a photographing lens, F: focal length of the meniscus lens, $D_1$: distance from the aperture to the surface of the meniscus lens facing the aperture along the optical axis of the data-imprinting optical system, and $R_3$: the radius of curvature of the surface of the meniscus lens opposite that facing the aperture (a paraxial radius of curvature in a case where the surface is an aspherical surface).

Preferably, the meniscus lens is formed from an organic material, and the surface of the meniscus lens opposing the photographing information/data display member is aspherically concave. Further, the aperture is preferably located on the part of the meniscus lens opposing the photographing information/data display member.

Preferably, a conditional equation (4) provided below is satisfied when the angle of inclination assumes a positive value in a case where an optical axis of a photographing optical system moves away from an optical axis of the data-imprinting optical system as the data-imprinting optical system approaches the film surface:

$$0.0° \leq \theta < 10.0° \qquad (4)$$

Preferably, the data display member is disposed opposite the optical axis of the photographing optical system with reference to the optical axis of the data-imprinting optical system, and a conditional equation (5) provided below is satisfied, given that the minimum distance between the optical axis of the data-imprinting optical system and the data display member within a plane perpendicular to the optical axis of the data-imprinting optical system is taken as H:

$$0.0 < H/F < 0.5 \qquad (5)$$

Preferably, the data display member is included, and a conditional equation (6) provided below is satisfied, given that, when the surface of the data display member is inclined so as to approach the film surface as the data display member moves away from the optical axis of the photographing optical system within the plane perpendicular to the optical axis of the photographing optical system, the angle of inclination is taken as θd and the direction in which the inclination becomes greater is taken as positive:

$$0.0° \leq \theta d < 10.0° \qquad (6)$$

Preferably, the center of the aperture is made closer to the optical axis of the photographing lens within a plane perpendicular to the optical axis of the data-imprinting optical system, and the geometry of the brightness aperture is defined such that an area equivalent to that of an aperture capable of satisfying desired brightness can be ensured and such that the aperture is made longer in one direction than in another direction.

The data-impinging optical system according to the present invention imprints display data on a film negative from the direction of an object for the following reasons. For example, if a character string for the display data corresponds to a date, at least seven characters are required; i.e., two numerals for a year, at least one for a month, two numerals for a date, and spaces between the three fields. If the character string is displayed through use of a light-source system, a considerable space is required. Further, a substrate suitable for use in displaying data, such as a circuit, also becomes bulky, which in turn requires a larger space. A room for such a space is not available on a back cover of a camera opposing a reverse side of a film negative. For this reason, there is no alternative but to imprint data on a film surface by way of a photographing lens through exposure. In fact, a date-imprinting optical system of early type doubles as a display to be indicated in a viewfinder. A character string equipped with an illumination light source is disposed at an upper part of the viewfinder. The character string is imprinted on the front surface of a film negative by way of the inside of the viewfinder, a film box, and a mirror through exposure. To this end, a large number of optical components are required, which poses a problem of cost or alignment of an optical axis. The data-imprinting optical system according to the present invention must be constructed so that it can be applied to a low-cost unsophisticated camera. Hence, such a layout of the optical system is not allowed. Therefore, projection of a character string directly on the front surface of the film negative from the front side of the camera is indispensable.

In the case of a recent camera, particularly a compact camera, a main camera unit is made thin, and direct imprinting of data onto a film negative requires a considerably short conjugate distance. At this time, a character string for data cannot be made smaller than a certain size, for reasons of brightness. Hence, a relatively wide view angle is required. Moreover, a character string serving as display data must be projected on a specific location on a film surface. Hence, a desirable location is a lower corner on a film negative at which the character string will not hinder exposure of an object image. For this reason, the data-imprinting optical system must be provided so as to avoid a luminous flux of the photographing lens.

The operation of the present invention will be described by reference to claims.

Claim 1 provides basic requirements for embodying a data-imprinting optical system according to the present invention. More specifically, the optical system is independent of a photographing lens. The optical system comprises a photographing information/data display member located on the part of a film surface opposing an object, and a single positive meniscus lens. The optical system imprints display data onto a film. So long as the following three conditional equations are satisfied, the optical system enables projection of data onto a film negative inexpensively and with high performance.

Conditional equation (1) enables layout of the data-imprinting optical system on the front side of the camera. More specifically, the equation defines the relationship between the focal length F of a meniscus lens and a distance L between the photographing information/data display member and the film surface with reference to the optical axis of the photographing lens. Here, the focal length F substantially corresponds to the conjugate length of the data-imprinting optical system. Provided that the distance between the principal points of a lens is disregarded and that an imaging factor is equi-magnification, the shortest conjugate length of a lens having the focal length F is 4F. The lower limiting value of the equation is defined in consideration of inclination of the data-imprinting optical system relative to the optical axis of the photographing lens. The lower limiting value is substantially equi-magnification. In contrast, the upper limit value of the equation corresponds to an imaging factor of about ×2.6 or ×0.4. If the upper limiting value is exceeded, the data-imprinting optical system moves away from the film surface, which is preferable in terms of lens layout. Concurrently, required positional accuracy of a lens (when the imaging factor is ×2.6 magnification or greater) becomes excessively stringent, or the lens approaches too closely to the film surface, thereby rendering layout of the lens excessively difficult (when the imaging factor is ×0.4 magnification or less).

Conditional equations (2) and (3) are for realizing an optical system having a wide view angle in the vicinity of equi-magnification and making appropriate the geometry of the data-imprinting optical system which establishes an anastigmatic relationship between an abaxial luminous flux and the aperture, as well as making appropriate the positional relationship between the aperture and the lens. If Equation (2) assumes a value which is lower than the lower limiting value thereof, a distance $D_1$ between the aperture and the lens becomes too small, thereby resulting in an excessively large astigmatism. As a result, the anastigmatic relationship is lost, with the result that uniform imaging performance is not achieved. If Equation (2) assumes a value greater than the upper limiting value thereof, the aperture becomes excessively distant from the lens, thereby rendering the data-imprinting optical system bulky and hindering space saving. If Equation (3) assumes a value lower than the lower limiting value thereof, the surface of the meniscus lens distant from the aperture assumes an excessively-large negative radius of curvature $R_3$ (or a paraxial radius of curvature if the surface is aspheric), and field tilt arises, thereby losing the anastigmatic relationship. As a result, uniform imaging performance is not achieved. In contrast, if Equation (3) assumes a value higher than the upper limiting value thereof, a field curvature is excessively corrected, thereby deteriorating an imaging characteristic of the optical system.

Consequently, the principal object of the present invention; that is, a data-imprinting optical system having a short conjugate length, a wide view angle, and a uniform imaging characteristic, can be achieved, so long as the foregoing three conditional equations (1) through (3) are satisfied.

Claim 2 defines the configuration of a data-imprinting optical system for reducing costs and improving the performance of the optical system to a much greater extent. The aperture is disposed on a part of the photographing information/data display member, and hence the surface of the meniscus lens opposing the meniscus lens is concave. The principal point of the lens is moved to a point on the part of an image surface. Hence, even at the time of equi-magnification, the lens is located offset toward the display member, thereby yielding an advantage in terms of layout of a lens. As a result of the surface of the meniscus lens opposing the aperture (i.e., the surface of the meniscus lens remaining in contact with the aperture) being formed into an aspherical lens, spherical aberration and coma aberration are corrected. Further, so long as the meniscus lens is formed from an organic material, lens cost can be diminished. Consequently, a reduction in cost and improvement in performance of the data-imprinting optical system can be achieved by means of satisfying the requirements described in claim 2.

Claims 3 through 6 define requirements for arranging the data-imprinting optical system such that no interference arises between a luminous flux of the data-imprinting optical system and a luminous flux of the photographing optical system.

If conditional equation (4) defined in claims 3 and 4 assumes a value lower than the lower limiting value thereof, the advantage concerning the lens layout cannot be yielded. In contrast, if conditional equation (4) assumes a value greater than the upper limiting value thereof, there is yielded an advantage in terms of layout of a lens. However, the view angle of the photographing information/data display member becomes excessively larger than that of the data-imprinting optical system. According to a rule of the fourth power of the cosine, an imbalance arises in the amount of ambient light, and an unbalanced drop in the amount of light undesirably arises. The tilt of an imprinted image is made greater by perspective, thereby deteriorating the performance of forming an image on a film surface.

Claims 5 and 6 define requirements for arranging the photographing information/data display member at a point on the optical axis of the photographing lens away from the optical axis of the data-imprinting optical system. For the same reasons described in connection with claims 3 and 4, there can be yielded an advantage in terms of layout of a lens. If conditional equation (5) assumes a value lower than the lower limiting value thereof, difficulty is encountered in yielding the advantage. In contrast, if conditional equation (5) assumes a value higher than the upper limiting value thereof, the view angle becomes excessively large, with the result that a drop in the amount of ambient light arises and field tilt arises. Consequently, the imaging performance of the optical system is deteriorated.

Claim 7 yields a working-effect and an advantage; that is, ability to correct field tilt by utilization of perspective and an improvement in performance, by means of inclining the photographing information/data display member relative to the optical axis of the data-imprinting optical system, and, by extension, to the optical axis of the photographing lens. If conditional equation (6) assumes a value lower than the lower limiting value thereof, no advantage is yielded or a reverse effect will arise. In contrast, if conditional equation (6) assumes a value greater than an upper limiting value, the view angle becomes excessively large, and a drop in the amount of ambient light arises or excessive field tilt arises, thereby deteriorating the imaging performance of the optical system. In a camera, such as a lens-equipped film, which has a film surface curved in a longitudinal direction, the corner of the film surface at which data are to be imprinted is tilted, thus enabling correction of field tilt.

Claim 8 defines deviation of the center of the aperture or change in the size of the aperture depending on a direction. As a result, the imaging performance of the optical system is improved, thereby increasing the focal depth. For instance, the focal depth is small in the sagittal direction, the length of an opening of the aperture is increased in the tangential direction, and the length of the opening of the aperture is shortened in the sagittal direction. Consequently, the focal depth in the tangential direction is made slightly shallow. However, the focal depth of the overall optical system in the sagittal direction can be increased.

BRIEF DESCRIPTION OF THE DRAWINGS

FIGS. 6A to 6C show charts of aberrations (e.g., a spherical aberration, a field curvature, and a distortion) of the optical system according to Example 3;

FIG. 7 is a schematic view showing a data-imprinting optical system for use with a camera according to Example 4;

DESCRIPTION OF THE PREFERRED EMBODIMENTS

A data-imprinting optical system for a camera according to a preferred embodiment of the present invention will now be described.

Figure 1:
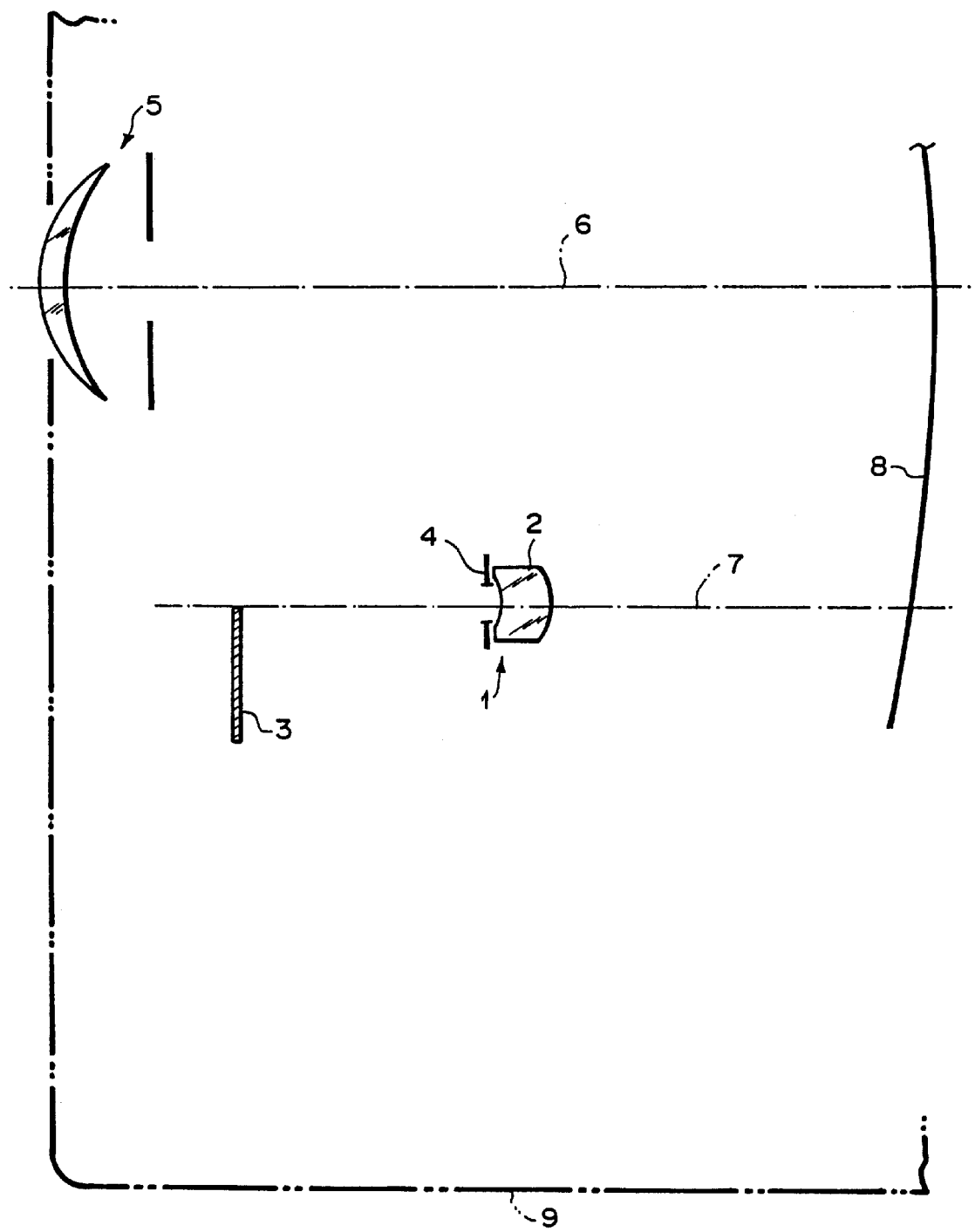
FIG. 1 is a schematic view showing the layout of a data-imprinting optical system for use with a camera according to an embodiment of the present invention.

FIG. 1 is a schematic view showing the layout of an image pickup optical system according to a preferred embodiment provided within a lens-equipped film. A data-imprinting optical system 1 for a camera comprises a positive meniscus lens 2 and a brightness aperture 4 disposed on the part thereof facing a data display member 3. The optical system 1 is separate from a photographing optical system 5. An optical axis 7 of the optical system 1 is slightly inclined at an angle θ with respect to an optical axis 6 of the photographic optical system 5. The angle of inclination θ is set such that the optical axes 6 and 7 move away from each other as the optical system 1 approaches the surface of a film negative 8 (hereinafter called a "film surface 8"). The angle of inclination θ is set so as to fall within the range of $0.0°≤θ<10.0°$. A phantom line shown in FIG. 1 denotes a housing 9.

The positive meniscus lens 2 is a plastic lens whose surface opposing the data display member 3 is an aspherical concave surface. An image 20 of display information appearing on the data display member 3 is projected on the film surface 8. The aspherical surface is expressed by an aspherical surface equation provided below.

Aspherical Surface Equation $$X = \frac{Ch^2}{(1+\sqrt{1-kC^2h^2})} + A4h^4 + A6h^6 + A8h^8 + A10h^{10} \quad \text{Eq. 1}$$

where

X: the length of the normal to a tangent plane (a plane perpendicular to the optical axis) at the apex of the aspherical surface, the normal extending from a point on the aspherical surface spaced a height "h" from the optical axis, C: the reciprocal of a paraxial radius of curvature R of the aspherical surface h: the height from the optical axis k: eccentricity A4, A6, A8, and A10: aspherical coefficients of order 4, 6, 8, and 10.

The data display member 3 is formed from a liquid-crystal display element capable of displaying photographing data;

e.g., desired date data. The data display member 3 utilizes as backlight the extraneous light entering from a slit formed in the front surface of the housing 9.

Figure 2:
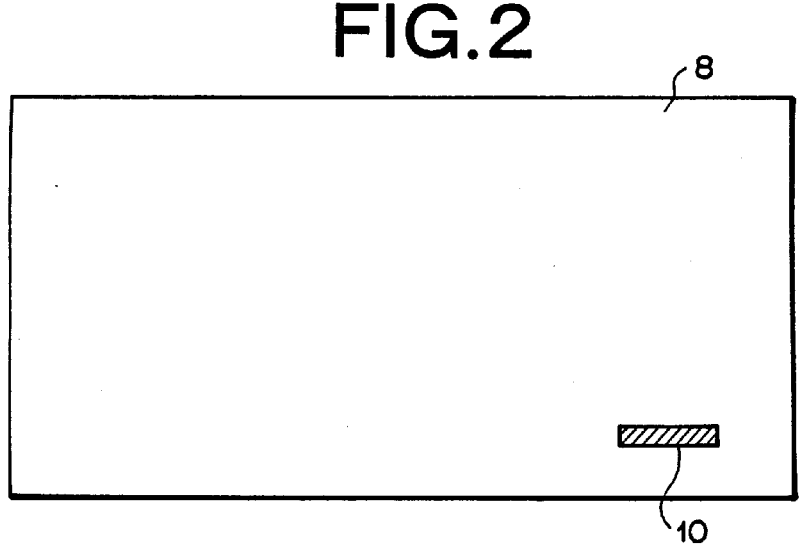
FIG. 2 is a schematic view showing a position on a film surface at which data are to be imprinted by means of exposure.

A luminous flux carrying the photographing information projected on the liquid-crystal element passes through the brightness aperture 4 and forms an image on the surface 8 of a film negative by way of the positive meniscus lens 2. As shown in FIG. 2, predetermined information is imprinted on a predetermined location 10 in the vicinity of the lower right corner of the film surface 8, by means of exposure.

The present embodiment will now be described hereunder by reference to specific Examples 1 through 7.

EXAMPLE 1

Figure 3:
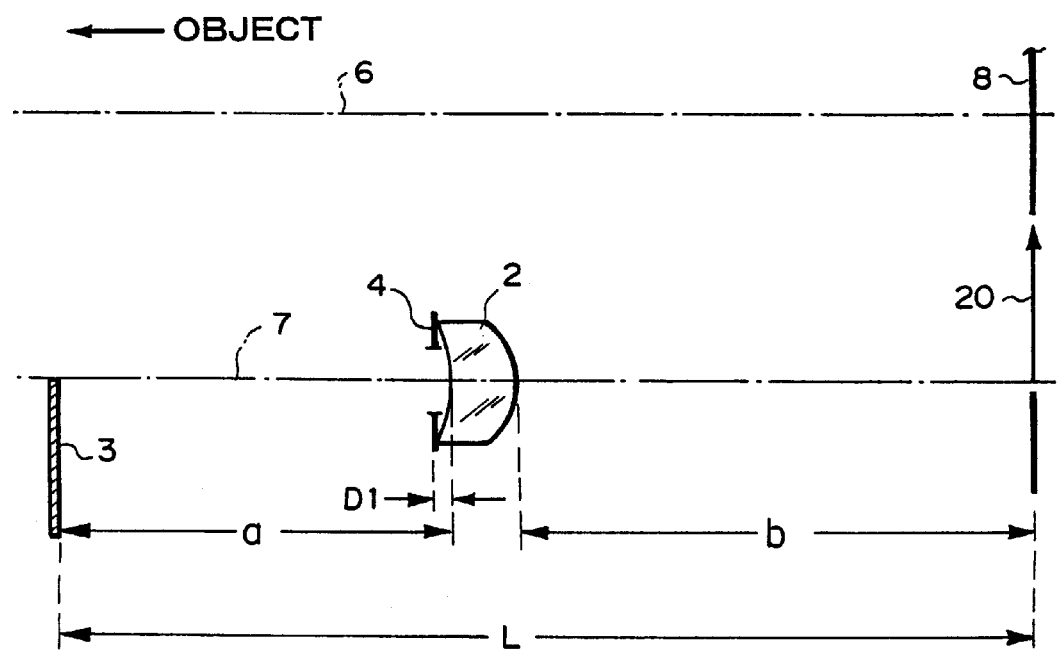
FIG. 3 is a schematic view showing a data-imprinting optical system for use with a camera according to Example 1.

FIG. 3 shows the construction of the data-imprinting optical system 1 according to Example 1. The angle of inclination of the optical axis 7 with respect to the optical axis 6 is set to 0°. The data display member 3 is aligned perpendicular to the optical axis 7 of the optical system 7.

The photographing optical system 1 according to Example 1 is constructed so as to satisfy conditional expressions (1) through (3) provided below.

$$3.9 ≤ L/F < 5.0 \quad (1)$$

$$0.02 < D_1/F < 0.10 \quad (2)$$

$$-0.5 < R_3/F < -0.2 \quad (3)$$

where,

L: distance from the photographing data display member 3 to the film surface 8 along the optical axis of a photographing lens, F: focal length of the meniscus lens, $D_1$: distance from the aperture 4 to the surface of the meniscus lens 2 facing the aperture 4 along the optical axis of the data-imprinting optical system 1, and $R_3$: the radius of curvature of the surface of the meniscus lens 2 opposite that facing the aperture 4.

Table 1 shows the radius of curvature R (mm) of each of surfaces of the lens (including a surface of the aperture), a distance D (mm) between the surfaces of the lens along the axis of the lens, the refractive index N of the lens with reference to line "d," and Abbe's number ν of the lens. In the middle of Table 1, there are provided constants of aspherical surfaces expressed by the aspherical surface equation (marked with an asterisk in Table 1). A lower portion of Table 1 provides a focal length F (mm), an object distance "a," an image distance "b," a conjugate distance "L," numerical values corresponding to Equations (1) to (6) described in claims, an F number of an overall lens system, a view angle of 2ω (degrees), and an imaging factor β according to Example 1. In Table 1 and subsequent tables, numerals assigned to individual symbols increase in sequence from the object side of the optical system.

TABLE 1

| SURFACE | R | D | $N_d$ | $v_d$ |
|---|---|---|---|---|
| 1 | APERTURE | 0.3500 | 1.00000 | |
| 2 | −2.9770* | 1.5900 | 1.49023 | 57.6 |
| 3 | −1.5967 | | | |

TABLE 1-continued

| SURFACE | C | k | A4 |
|---|---|---|---|
| 2 | −0.335909 | 8.4551 | $1.0254 \times 10^{-2}$ |

| SURFACE | A6 | A8 | A10 |
|---|---|---|---|
| 2 | $-2.0904 \times 10^{-1}$ | $5.8859 \times 10^{-1}$ | $-6.4392 \times 10^{-1}$ |

NUMERICAL DATA

| | |
|---|---|
| FOCAL LENGTH | F = 5.094 |
| OBJECT DISTANCE (DISTANCE BETWEEN DISPLAY MEMBER AND FRONT SURFACE OF PROJECTION LENS) | a = 8.445 |
| IMAGE DISTANCE (DISTANCE BETWEEN REAR SURFACE OF PROJECTION LENS AND IMAGE-FORMATION SURFACE) | b = 11.159 |
| CONJUGATE LENGTH (DISTANCE BETWEEN DISPLAY MEMBER AND IMAGE-FORMATION SURFACE) | L = 21.195 |
| L/F = 4.161 | |
| $D_1/F = 0.069$ | |
| $R_3/F = -0.313$ | |
| θ = 0.0° | |
| H = 0.0 | |
| θd = 0.0° | |
| F NUMBER = 7.60 | |
| VIEW ANGLE OF 2ω = 47.0° | |
| IMAGING FACTOR β = −1.014 | |

Figure 4A:
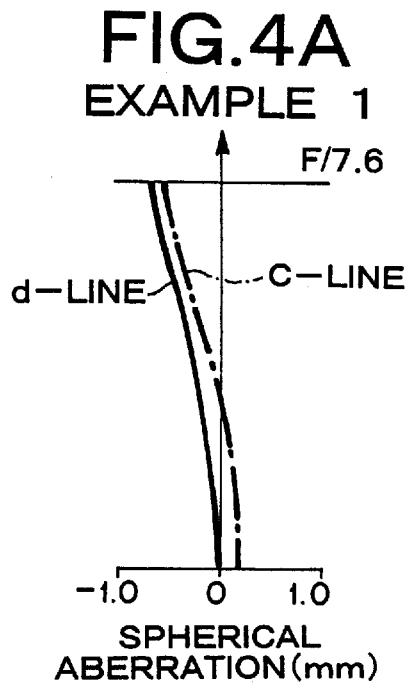
FIGS. 4A to 4C show charts of aberrations (e.g., a spherical aberration, a field curvature, and a distortion) of the optical system according to Example 1.
Figure 4B:
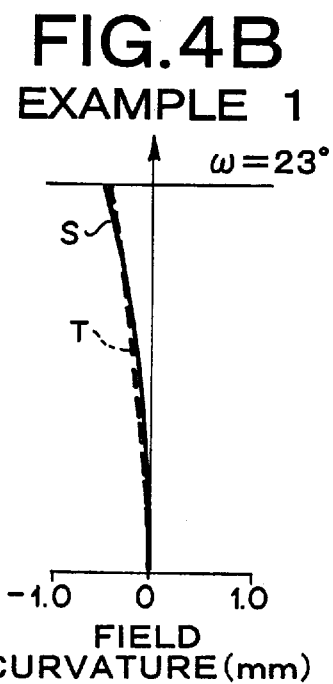
Figure 4C:
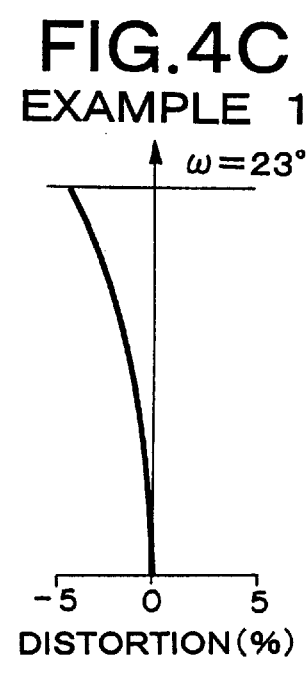

FIGS. 4A to 4C provide aberration charts showing aberrations (i.e., a spherical aberration, a field curvature, and a distortion) of the optical system according to Example 1. In each of the aberration charts, symbol "ω" designates a half view angle. Further, the spherical aberration charts show an aberration relative to line "d" and an aberration relative to line "C." Further, an aberration chart relating to a field curvature provides an aberration relative to a sagittal image surface and a tangential image surface.

EXAMPLE 2

A data-imprinting optical system for a camera according to Example 2 is substantially identical with the lens according to Example 1 and yields substantially the same advantage as that yielded by the lens according to Example 1. Here, the lens 2 has an aspherical surface on either side.

Table 2 shows the radius of curvature R (mm) of each of surfaces of the lens (including a surface of the aperture), a distance D (mm) between the surfaces of the lens along the axis of the lens, the refractive index N of the lens with reference to line "d," and Abbe's number ν of the lens. In the middle of Table 2, there are provided constants of aspherical surfaces expressed by the aspherical surface equation (marked with an asterisk in Table 2). A lower portion of Table 2 provides a focal length F (mm), an object distance "a," an image distance "b," a conjugate distance "L," numerical values corresponding to Equations (1) to (6) described in claims, an F number of an overall lens system, a view angle of 2ω (degrees), and an imaging factor β according to Example 2.

TABLE 2

| SURFACE | R | D | $N_d$ | $ν_d$ |
|---|---|---|---|---|
| 1 | APERTURE | 0.5875 | 1.00000 | |
| 2 | −2.1200* | 1.1895 | 1.49023 | 57.6 |
| 3 | −1.3790* | | | |

| SURFACE | C | k | A4 |
|---|---|---|---|
| 2 | −0.4716981 | 8.0862 | $3.0227 \times 10^{-2}$ |
| 3 | −0.7251632 | 0.2755 | $1.4317 \times 10^{-2}$ |

| SURFACE | A6 | A8 | A10 |
|---|---|---|---|
| 2 | $-8.8696 \times 10^{-2}$ | $1.4957 \times 10^{-1}$ | $3.8241 \times 10^{-1}$ |
| 3 | $-7.4581 \times 10^{-3}$ | $2.0333 \times 10^{-2}$ | $-4.9764 \times 10^{-3}$ |

NUMERICAL DATA

| | |
|---|---|
| FOCAL LENGTH | F = 5.267 |
| OBJECT DISTANCE (DISTANCE BETWEEN DISPLAY MEMBER AND FRONT SURFACE OF PROJECTION LENS) | a = 8.791 |
| IMAGE DISTANCE (DISTANCE BETWEEN REAR SURFACE OF PROJECTION LENS AND IMAGE-FORMATION SURFACE) | b = 11.766 |
| CONJUGATE LENGTH (DISTANCE BETWEEN DISPLAY MEMBER AND IMAGE-FORMATION SURFACE) | L = 21.747 |
| L/F = 4.121 | |
| $D_1/F = 0.112$ | |
| $R_3/F = -0.262$ | |
| θ = 0.0° | |
| H = 0.0 | |
| θd = 0.0° | |
| F NUMBER = 7.60 | |
| VIEW ANGLE OF 2ω = 47.0° | |
| IMAGING FACTOR β = −1.015 | |

Figure 5A:
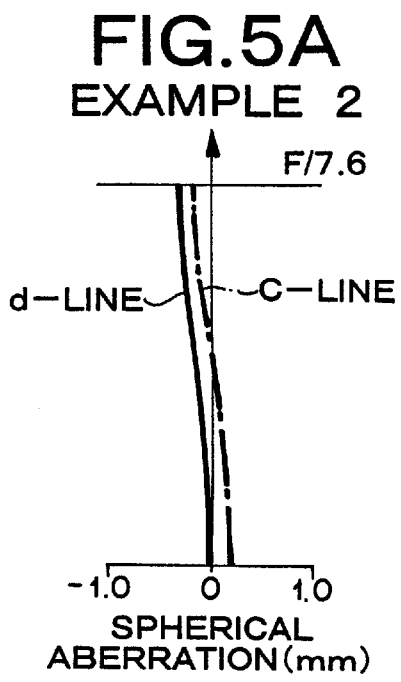
FIGS. 5A to 5C show charts of aberrations (e.g., a spherical aberration, a field curvature, and a distortion) of the optical system according to Example 2.
Figure 5B:
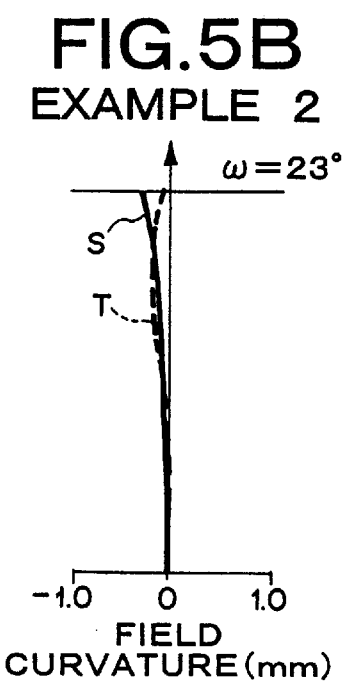
Figure 5C:
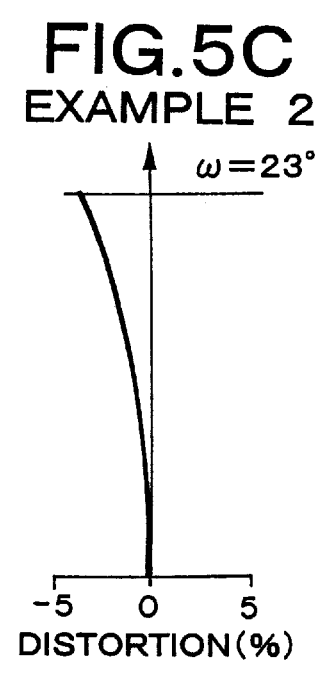

FIGS. 5A to 5C provide charts showing aberrations (i.e., a spherical aberration, a field curvature, and a distortion) of the optical system according to Example 2. In each of the aberration charts, symbol "ω" designates a half view angle. Further, the spherical aberration charts show an aberration relative to line "d" and an aberration relative to line "C." Further, an aberration chart relating to a field curvature provides an aberration relative to a sagittal image surface and a tangential image surface.

EXAMPLE 3

A data-imprinting optical system for a camera according to Example 3 is substantially identical with the lens according to Example 1 and yields substantially the same advantage as that yielded by the lens according to Example 1. Here, the lens 2 has an aspherical surface on either side.

Table 3 shows the radius of curvature R (mm) of each of surfaces of the lens (including a surface of the aperture), a distance D (mm) between the surfaces of the lens along the axis of the lens, the refractive index N of the lens with reference to line "d," and Abbe's number ν of the lens. In the middle of Table 3, there are provided constants of aspherical surfaces expressed by the aspherical surface equation (marked with an asterisk in Table 3). A lower portion of Table 3 provides a focal length F (mm), an object distance "a," an image distance "b," a conjugate distance "L," numerical values corresponding to Equations (1) to (6) described in claims, an F number of an overall lens system, a view angle of 2ω (degrees), and an imaging factor β according to Example 3.

TABLE 3

| SURFACE | R | D | $N_d$ | $v_d$ |
|---|---|---|---|---|
| 1 | APERTURE | 0.4069 | 1.00000 | |
| 2 | −2.7030* | 1.4989 | 1.49023 | 57.6 |
| 3 | −1.5570 | | | |

| SURFACE | C | k | A4 |
|---|---|---|---|
| 2 | −0.3699593 | 8.3043 | $-1.2005 \times 10^{-3}$ |

| SURFACE | A6 | A8 | A10 |
|---|---|---|---|
| 2 | $-6.5225 \times 10^{-2}$ | $-7.7856 \times 10^{-3}$ | $1.6319 \times 10^{-1}$ |

NUMERICAL DATA

FOCAL LENGTH $F = 5.238$
OBJECT DISTANCE (DISTANCE BETWEEN DISPLAY MEMBER AND FRONT SURFACE OF PROJECTION LENS) $a = 8.565$
IMAGE DISTANCE (DISTANCE BETWEEN REAR SURFACE OF PROJECTION LENS AND IMAGE-FORMATION SURFACE) $b = 11.695$
CONJUGATE LENGTH (DISTANCE BETWEEN DISPLAY MEMBER AND IMAGE-FORMATION SURFACE) $L = 21.759$
$L/F = 4.154$
$D_1/F = 0.078$
$R_3/F = -0.297$
$\theta = 0.0°$
$H = 0.0$
$\theta d = 0.0°$
F NUMBER = 7.60
VIEW ANGLE OF $2\omega = 47.0°$
IMAGING FACTOR $\beta = -1.050$ FIGS. 6A to 6C provide aberration charts showing aberrations (i.e., a spherical aberration, a field curvature, and a distortion) of the optical system according to Example 3. In each of the aberration charts, symbol "ω" designates a half view angle. Further, the spherical aberration charts show an aberration relative to line "d" and an aberration relative to line "C." Further, an aberration chart relating to a field curvature provides an aberration relative to a sagittal image surface and a tangential image surface.

EXAMPLE 4

A data-imprinting optical system for a camera according to Example 4 is substantially identical with the lens according to Example 1. The optical axis 7 of the optical system is inclined at an angle θ relative to the optical axis 6 of the photographing optical system. The optical system is constructed such that a conditional equation (4) provided below is satisfied when the angle of inclination assumes a positive value in a case where the optical axis 6 of the photographing optical system moves away from the optical axis 7 of the data-imprinting optical system as the optical system 1 approaches the film surface 8.

$$0.0° \leq \theta < 10.0° \tag{4}$$

This is illustrated in FIG. 7.

By means of setting the angle of inclination θ within the range set forth, there can be prevented occurrence of interference between a luminous flux of the data-imprinting optical system and a luminous flux of the photographing optical system, thereby improving the optical performance of the optical system.

EXAMPLE 5

A data-imprinting optical system for a camera according to Example 5 is substantially identical with the lens according to Example 1. The data display member 3 is disposed opposite the optical axis 6 of the photographing optical system with reference to the optical axis 7 of the data-imprinting optical system. The data-imprinting optical system is constructed such that a conditional equation (5) provided below is satisfied, given that the minimum distance between the optical axis 7 of the data-imprinting optical system and the data display member 3 within a plane perpendicular to the optical axis 7 is taken as H. Here, F denotes a focal length of the positive meniscus lens 2

$$0.0 < H/F < 0.5 \tag{5}$$

Figure 8:
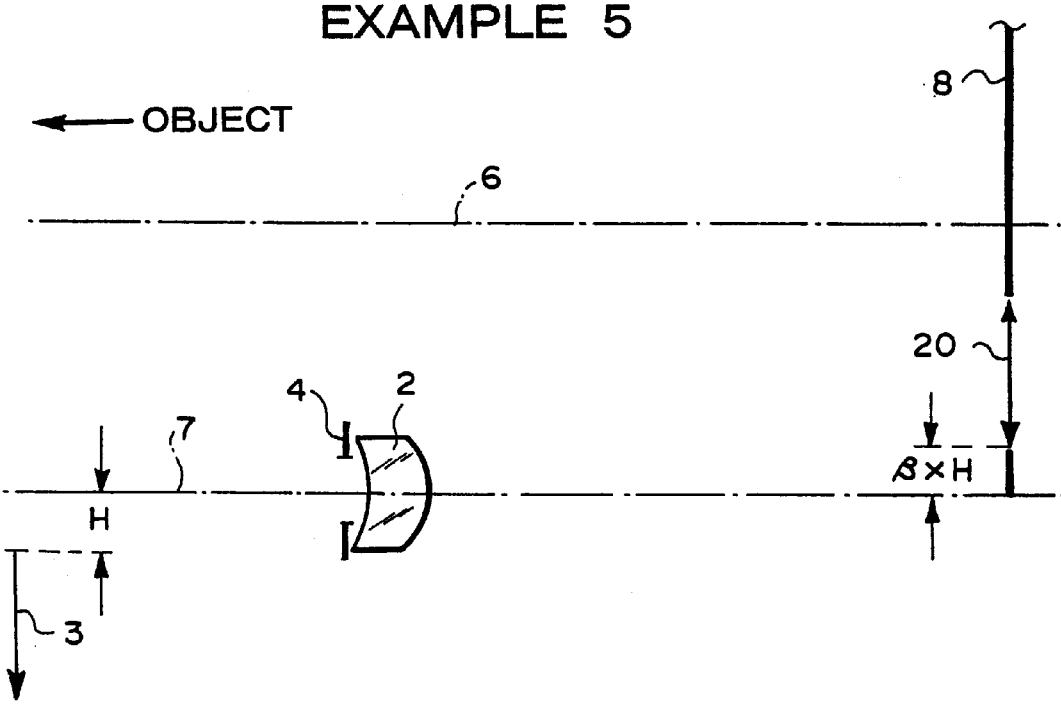
FIG. 8 is a schematic view showing a data-imprinting optical system for use with a camera according to Example 5.

This is illustrated in FIG. 8.

The above-described configuration yields an advantage in terms of layout of a lens and results in an improvement in optical performance of the data-imprinting optical system. An image 20 formed on the film surface 8 is formed at a distance of β×H (β designates an imaging factor) away from the optical axis 7.

By means of setting the angle of inclination θ within the range set forth, there can be prevented occurrence of interference between a luminous flux of the data-imprinting optical system and a luminous flux of the photographing optical system, thereby improving the optical performance of the optical system.

EXAMPLE 6

A data-imprinting optical system for a camera according to Example 6 is substantially identical with the lens according to Example 1. The data display member 3 is constructed so as to satisfy a conditional equation (6) provided below, given that, when the surface of the data display member 3 is inclined so as to approach the film surface 8 as the data display member 3 moves away from the optical axis 6 of the photographing optical system within the plane perpendicular to the optical axis 6 of the photographing optical system, the angle of inclination is taken as θd and the direction in which the inclination becomes greater is taken as a positive.

$$0.00° \leq \theta d < 10.0° \tag{6}$$

Figure 9:
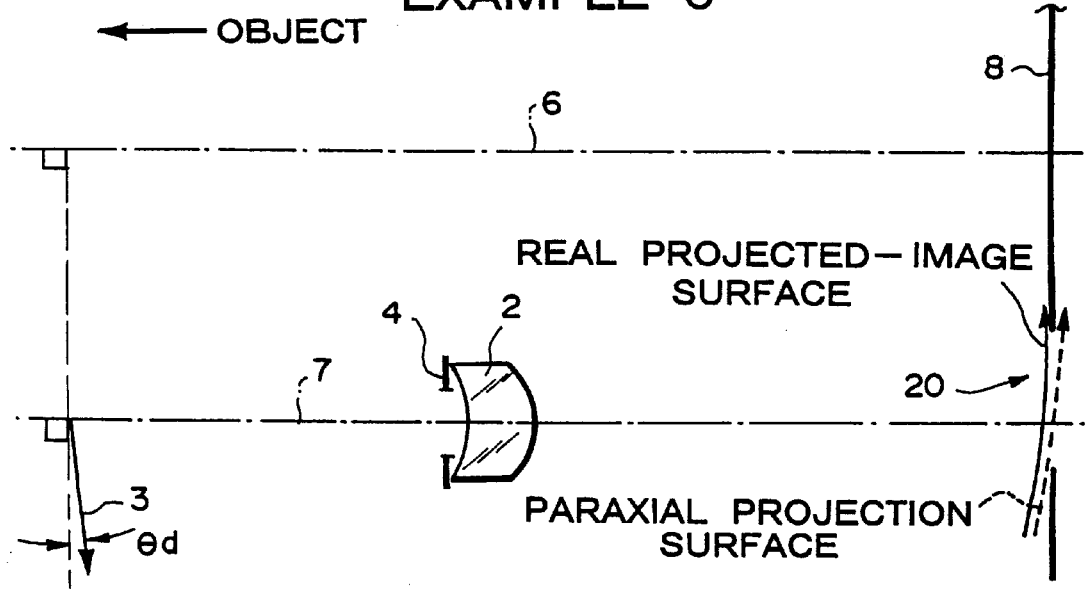
FIG. 9 is a schematic view showing a data-imprinting optical system for use with a camera according to Example 6.
Figure 10:
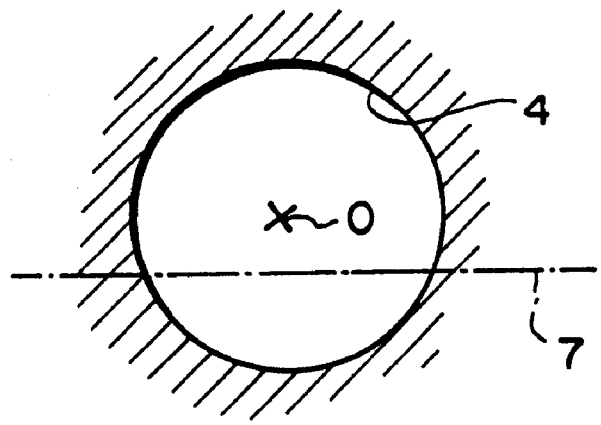
FIG. 10 is a schematic view showing a data-imprinting optical system for use with a camera according to Example 7.

This is illustrated in FIG. 9.

By means of setting angle θd within such a range and inclining the data display member 3 at a predetermined angle with respect to the optical axis 7 of the data-imprinting optical system and the optical axis 6 of the photographing lens, field tilt can be corrected by utilization of a perspective. This contributes to improve the performance of the optical camera. More specifically, a real projected-image plane can be formed at the corner of the curved film surface 8.

EXAMPLE 7

Figure 11:
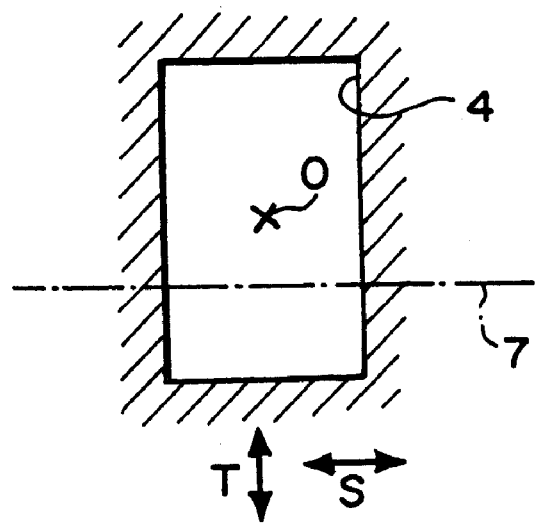
FIG. 11 is a schematic view showing a modification of the data-imprinting optical system according to Example 7.

A data-imprinting optical system according to Example 7 is basically constructed in the same manner as the data-imprinting optical system 1 according to Example 1. A center position O of the brightness aperture 4 is made closer to the optical axis 6 of the photographing lens relative to the optical axis 7 of the data-imprinting optical system, thereby eliminating harmful flare and improving the performance of the optical system. If the geometry of the brightness aperture 4 is defined such that the center of the brightness aperture 4 is offset from the optical axis 7 in one direction, a focal depth can be increased in that direction. For instance, in a case where a focal depth in a sagittal direction S is small, if the opening of the aperture in a tangential direction T is made longer and the opening of the aperture in the sagittal direction S is made shorter, as shown in FIG. 11, the focal depth in the tangential direction T is made slightly shallow but the focal depth in the sagittal direction S is increased. Hence, the focal depth of the overall optical system can be increased.

The data-imprinting optical system according to the present invention is not limited to those described in connection with the examples or combinations thereof. The optical system can be susceptible to various modifications. For instance, the positive meniscus lens is not limited to the geometry of the meniscus lens described in the examples. Moreover, glass can be used as material of a lens.

As has been described above, the data-imprinting optical system according to the present invention is composed of only a single piece of lens and an aperture. However, so long as the optical system satisfies the predetermined conditions, the optical system can be applied to a low-cost unsophisticated camera, thereby enabling miniaturization of and space-saving in a camera.

What is claimed is:

1. An optical system which imprints, onto a film surface, data appearing on a photographing information/data display member located on an objective side relative to the film surface and which is separate from a photographing lens, wherein the optical system comprises one meniscus lens having a positive refractive power and a brightness aperture and satisfies conditional expressions (1) through (3) provided below:

$$3.9 \leq L/F < 5.0 \tag{1}$$

$$0.02 < D_1/F < 0.10 \tag{2}$$

$$-0.5 < R_3/F < -0.2 \tag{3}$$

where,

L: is a distance from the photographing data display member to the film surface along an optical axis of a photographing lens, F: is a focal length of the meniscus lens, $D_1$: is a distance from an aperture to the surface of the meniscus lens facing the aperture along the optical axis of the data-imprinting optical system, and $R_3$: is a radius of curvature of the surface of the meniscus lens opposite that facing the aperture.

2. The data-imprinting optical system according to claim 1, wherein the meniscus lens is formed from an organic material; the surface of the meniscus lens opposing the photographing information/data display member is aspherically concave; and the aperture is located on the part of the meniscus lens opposing the photographing information/data display member.

3. The data-imprinting optical system according to claim 1, wherein a conditional equation (4) provided below is satisfied when an angle of inclination assumes a positive value in a case where an optical axis of a photographing optical system moves away from an optical axis of the data-imprinting optical system as the data-imprinting optical system approaches the film surface:

$$0.0° \leq \theta < 10.0° \tag{4}$$

4. The data-imprinting optical system according to claim 2, wherein a conditional equation (4) provided below is satisfied when an angle of inclination assumes a positive value in a case where an optical axis of a photographing optical system moves away from an optical axis of the data-imprinting optical system as the data-imprinting optical system approaches the film surface:

$$0.0° \leq \theta < 10.0° \tag{4}$$

5. The data-imprinting optical system according to claim 1, wherein the data display member is disposed opposite the optical axis of the photographing optical system with reference to the optical axis of the data-imprinting optical system, and a conditional equation (5) provided below is satisfied, given that the minimum distance between the optical axis of the data-imprinting optical system and the data display member within a plane perpendicular to the optical axis of the data-imprinting optical system is taken as H:

$$0.0 < H/F < 0.5 \tag{5}$$

6. The data-imprinting optical system according to claim 2, wherein the data display member is disposed opposite the optical axis of the photographing optical system with reference to the optical axis of the data-imprinting optical system, and a conditional equation (5) provided below is satisfied, given that the minimum distance between the optical axis of the data-imprinting optical system and the data display member within a plane perpendicular to the optical axis of the data-imprinting optical system is taken as H:

$$0.0 < H/F < 0.5 \tag{5}$$

7. The data-imprinting optical system according to claim 1, wherein the surface of the data display member is inclined so as to approach the film surface as the data display member moves away from the optical axis of the photographing optical system with reference to the plane perpendicular to the optical axis of the photographing optical system, and a conditional equation (6) provided below is satisfied when the angle of inclination is taken as θd and the direction in which the inclination becomes greater, is taken as positive:

$$0.0° \leq \theta d < 10.0° \tag{6}$$

8. The data-imprinting optical system according to claim 1, wherein a center of the aperture is made closer to the optical axis of the photographing lens within a plane perpendicular to the optical axis of the data-imprinting optical system, and the geometry of the brightness aperture is defined such that an area equivalent to that of an aperture capable of satisfying desired brightness can be ensured and such that the aperture is made longer in one direction than in another direction.

9. The data-imprinting optical system according to claim 1, wherein said surface of the meniscus lens opposite that facing the aperture is an aspherical surface and has a paraxial radius of curvature which is expressed by said $R_3$.

* * * * *